US 6,731,996 B1

(12) United States Patent
MacEwen et al.

(10) Patent No.: US 6,731,996 B1
(45) Date of Patent: May 4, 2004

(54) METHOD OF USING ISOTROPIC PLASTICITY TO MODEL THE FORMING OF ANISOTROPIC SHEET

(75) Inventors: Stuart R. MacEwen, Inverary (CA); Pei-Dong Wu, Kingston (CA)

(73) Assignee: Alcan International Limited, Kingston (CA)

(*) Notice: Subject to any disclaimer, the term of this patent is extended or adjusted under 35 U.S.C. 154(b) by 0 days.

(21) Appl. No.: 09/421,102

(22) Filed: Oct. 19, 1999

Related U.S. Application Data

(60) Provisional application No. 60/108,844, filed on Nov. 18, 1998.

(51) Int. Cl.[7] ............................. G06F 17/00; B21D 5/00
(52) U.S. Cl. ........................................... 700/97; 702/42
(58) Field of Search ............................. 700/97; 702/34, 702/42; 703/7

(56) References Cited

U.S. PATENT DOCUMENTS

| | | | | |
|---|---|---|---|---|
| 4,658,362 A | | 4/1987 | Bhatt | 364/472 |
| 4,742,473 A | | 5/1988 | Shugar et al. | 364/518 |
| 5,029,469 A | * | 7/1991 | Chase et al. | 73/159 |
| 5,128,877 A | | 7/1992 | Tang | 364/476 |
| 5,315,537 A | | 5/1994 | Blacker | 364/570 |
| 5,341,303 A | | 8/1994 | Foroudastan et al. | 364/468 |
| 5,379,227 A | | 1/1995 | Tang et al. | 364/472 |
| 5,390,127 A | | 2/1995 | Tang et al. | 364/472 |
| 5,402,366 A | | 3/1995 | Kihara et al. | 364/578 |
| 5,442,569 A | | 8/1995 | Osano | 364/578 |
| 5,463,558 A | | 10/1995 | Tang et al. | 364/472 |
| 5,572,896 A | * | 11/1996 | Story | 72/350 |
| 5,581,489 A | | 12/1996 | Groothuis et al. | 364/578 |
| 5,671,167 A | | 9/1997 | Ito et al. | 364/578 |
| 5,729,462 A | | 3/1998 | Newkirk et al. | 364/468.03 |
| 6,009,378 A | * | 12/1999 | Tang et al. | 702/34 |
| 6,205,366 B1 | * | 3/2001 | Tang et al. | 700/97 |

OTHER PUBLICATIONS

The American Heritage Dictionary of the English Language 2000, 4th edition, Houghton Muifflin Company.*
Hadi Saadat, "Power System Analysis" 1999, McGraw–Hill Companies Inc., pp. 240–245.*
Samuel Forest, "Cosserat Modeling of Size Effects in Crystalline Solids" Multiscale Materials Modeling—2000, Material Research Society, vol. 653, p. 2, paragraphs 3–5.*
Pickett, A. K., Queckbörner, T., DeLuca, P., Haug, E.; "An explicit finite element solution for the forming prediction of continuous fibre–reinforced thermoplastic sheets"; Composites Manufacturing, 1995, vol. 6, No. 3–4, pp. 237–243.

* cited by examiner

Primary Examiner—Leo Picard
Assistant Examiner—Sean P Shechtman
(74) Attorney, Agent, or Firm—Bracewell & Patterson, L.L.P.

(57) ABSTRACT

A method of fabricating an article from a blank of material (e.g., aluminum alloy sheet) having anisotropic deformation properties, with tooling which has been designed by predicting flow and deformation of the blank using an analysis which decouples the anisotropic deformation properties of the blank. The method calculates the response of a small amount of the blank using crystal plasticity theory. The blank can be represented as a mesh having a plurality of elements. A strain path is predicted for each element using finite element analysis (FEA), and a stress-strain curve is defined for each element by performing a material point simulator (MPS) calculation for each element using its respective strain path. A second FEA is then carried out on the elements using the respective stress-strain curve for each element. The stress-strain curve for each element may be defined by assigning to each element a curve which lies between an upper bound curve and a lower bound curve, using various methods. The computational model requires much less CPU time compared to prior art methods.

12 Claims, 4 Drawing Sheets

METHOD OF USING ISOTROPIC PLASTICITY TO MODEL THE FORMING OF ANISOTROPIC SHEET

This application claims the benefit of U.S. Provisional Application No. 60/108,844, filed Nov. 18$^{th}$ 1998.

BACKGROUND OF THE INVENTION

1. Field of the Invention

The present invention generally relates to the shaping of deformable materials, and more particularly to a method of forming metal sheet into useful articles, wherein tooling is designed using mathematical models that rely on finite element analysis (FEA) techniques to optimize forming operations, tooling design and product performance in the formed articles.

2. Description of Related Art

Many articles are made by stamping, pressing or punching a base material so as to deform it into a piece or part having a useful shape and function. The present invention is concerned with mathematical modelling of the mechanics of such material flow and deformation, and is particularly concerned with the deformation of metal (e.g., aluminum) sheet using tools and dies, to produce a wide variety of products, from beverage cans to components for automotive applications.

When designing the shape of a product, such as a beverage can, it is important to understand how the deformation process will affect the blank of sheet metal. Finite element analysis codes, available from a variety of companies, can be used to analyze plasticity, flow and deformation to optimize forming operations, tooling design and product performance in product designs. These models may result in tooling which improves the quality of a product as well as reducing its cost. The predictive capability of such finite element models is determined to a large extent by the way in which the material behavior is described therein.

In order to appreciate the complexities of modelling the deformation process, it is helpful to understand some basic concepts of mechanical metallurgy, including the concepts of yield stress, workhardening, and strain path.

When some type of external loading device, such as a tensile test machine deforms a metal, the initial response is elastic, with a linear relationship between stress and strain. At some value of the stress, determined by the microstructure of the metal, plastic deformation begins and the response is non-linear, and comprises elastic plus plastic deformation. The yield stress defines the strength of the metal at the condition where plastic deformation is initiated. Deformation beyond the yield stress is characterized by workhardening which causes the stress to increase at an ever decreasing rate until a failure mechanism intervenes and the sample breaks. Thus, the yield stress value and the workhardening curve are the two fundamental entities that define the plastic deformation of metals.

The forming of metal sheet into industrial or consumer products (e.g., cans and automotive components) occurs under multi-axial straining conditions, not the simple uniaxial path described above (tensile testing). In such cases the deformation is described by the strain path. The strain path is defined by the plastic strain tensor.

A tensor is a mathematical entity that is useful in describing various physical properties. Most physical properties can be expressed as either a scalar, a vector, or a tensor. A scalar quantity is one which can be specified with a single number (e.g., temperature or mass), while a vector quantity is one which requires two values, such as magnitude and direction (e.g., velocity or force). A tensor quantity is a higher-order entity that requires more than two values, i.e., more than a single magnitude and direction. For example, a stress tensor is a 3×3 array, each term of which is defined by the stress acting on a given plane, in a given direction. As two direction cosines are required for transformations, the stress tensor is a second order tensor.

The plastic strain (or strain rate) tensor is a second order tensor, which can be expressed as a 3×3 matrix and, in principal axes, has the form:

| a | 0 | 0 |
|---|---|---|
| 0 | b | 0 |
| 0 | 0 | c |

Common strain paths and their associate values for the plastic strain tensor components are given below:

| STRAIN PATH | a | b | c |
|---|---|---|---|
| Uniaxial tension | −0.5 | 1 | −0.5 |
| Uniaxial Compression | 0.5 | −1 | 0.5 |
| Biaxial tension | 0.5 | 0.5 | −1 |
| Plane Strain Tension | 0 | 1 | −1 |
| Plane Strain Compression | 0 | −1 | 1 |

The concepts of the uniaxial stress-strain curve are extended to multi-axial plasticity by defining an effective stress and an effective strain, $\sigma_{eff}$ and $\epsilon_{eff}$, which are functions of the components of the stress and plastic strain tensors. The concepts of the yield stress and workhardening are then extended to multi-axial conditions through the use of $\sigma_{eff}$ and $\epsilon_{eff}$ in place of the $\sigma$ and $\epsilon$ of the uniaxial case. Specifically, the effective stress is given by the second invariant of the stress tensor, and plasticity is referred to as either $J_2$ or von Mises.

For an isotropic sheet of metal, the plasticity properties do not depend on direction or strain path, and the uniaxial stress-strain curve is all that is required to characterize the forming of sheet into a product. When aluminum sheet is rolled, however, it is anisotropic, meaning that some of the mechanical properties will not be the same in all directions. Because rolled sheet is anisotropic, yield stress as well as workhardening depend on both direction in the sheet and strain path. For example, in aluminum can body stock, the stress-strain curve for a sample cut with its tensile axis in the rolling direction lies below that for a sample cut in the transverse direction. Under multi-axial stress conditions one must now replace the concept of a yield point with that of a yield surface which, in multi-dimensional stress space, defines the boundary between elastic and plastic response. Workhardening manifests itself as an increase in the distance from the origin of stress to a point on the yield surface. One must also allow for the possibility that the workhardening rate may depend on the strain path. Thus, workhardening changes not only the size of the yield surface, but also its shape.

The anisotropy of sheet is determined by crystallographic texture, that is, by the orientations of the crystals that make up the sheet. As single crystal properties are highly anisotropic, the anisotropy of sheet depends on the distribution of orientations of the crystals that comprise it. Thus the orientation distribution function (ODF) is a fundamental property of sheet. There are various types of analysis programs that use crystallographic texture.

The crystallographic texture of sheet, in the form of pole figures, is obtained experimentally using X-ray or neutron diffraction. The ODF and the weights table are calculated from the pole figure data. The latter is particularly important as it defines the volume fraction of crystals having a particular orientation. Typically, the weights for at least 600 discrete orientations are determined by analysis of experimental diffraction data and provide the crucial input for crystal plasticity calculations.

Crystal plasticity theory allows a stress-strain response for a material to be calculated using a given crystallographic texture and specified strain path. A material point simulator (MPS) is an analysis technique that incorporates crystal plasticity theory. Under crystal plasticity theory, the response of a small amount of material subject to a specified strain path is calculated. The response of the aggregate is calculated from the weighted responses to each of the crystals contained in it. Single crystal yield stress and workhardening parameters are determined by an iterative procedure to match prediction from the simulation to a measured stress-strain curve (generally uniaxial tension or compression). Having so determined the single ctystal properties, the stress strain behavior for any desired strain path can be calculated. In addition to conventional workhardening, the calculationsusually include the evolution of texture during deformation along the strain path. In fact, comparison of measured and predicted textures after deformation provides the principal means of validation of material point simuators.

A further analysis technique that is used to model the forming and performance of products from sheet is finite element analysis (FEA). An FEA subdivides the sheet into a number of elements, typically from a few hundred for a simple analysis to 100,000 or more for complex parts and forming processes. The tooling used to form a part is also meshed, and contact between the tooling and sheet is allowed so that the simulated motion of the tooling in the model deforms the sheet and makes a virtual part just as real tooling makes a part in a plant. Thus it is not necessary to know a priori the strain path followed by each element during the forming operation; it is simply a response to the motion of the tooling. Examples of the use of FEA for forming products from sheet are given in U.S. Pat. Nos. 5,128,877, 5,379,227, 5,390,127, and 5,402,366. The first three of these patents disclose methods for aiding sheet metal forming tools, which include representing the sheet metal as a mesh and including a plurality of nodes and associated elements. A computer determines the stress state of a sampling point based on an incremental deformation theory of plasticity (the described "displacement method" is an FEA). The fourth patent discloses a method for simulating a forming operation using FEA and a particle flow model. These approaches do not involve any distinction between the anisotropic and isotropic characteristics of the sheet.

The plasticity properties of an individual element (or, more precisely, at each integration point within an element) are defined by the definitions of the yield surface and the hardening law, which comprise the essential material definitions required for the analysis. The vast majority of FEA use isotropic, von Mises plasticity for the former and a simple uniaxial stress-strain curve for the latter. A difficulty often exists in that the strains for a forming operation may exceed (in some cases by a factor of 10 or more) those achieved in the laboratory characterization of the sheet. In such a case, the FE analyst must provide the code with an extrapolation of the experimental data to strains in excess of those imposed by the tooling during the forming operation. This requirement is not a trivial task, as the hardening depends on both strain and strain path, due to the evolution of texture during the forming operation.

In many cases and especially for aluminum alloy sheet, anisotropy should be included in an FEA. Two basic options exist to do so. Over the past 50 years, a variety of analytical functions have been proposed to replace that of the isotropic von Mises. Notable are formulations by Hill in 1948, 1979, and 1990, Karafillis & Boyce in 1993, and Barlat in 1989, 1991 and 1997. The analytical function approach suffers two difficulties. First, since the function is a relatively simple, closed-form, algebraic expression it can only provide an approximation to the shape of the actual yield surface in six-dimensional stress space. In fact, in many cases the allowable stress space for analytical yield functions has been reduced to those appropriate for plane stress deformation. Secondly, the constants in these functions must be determined experimentally, from laboratory measurements of the anisotropy of the yield stress and/or r-value (ratio of width to thickness strain in a tensile test) for various strain paths and directions in the sheet. Typically, five or more experimental measurements must be made in order to evaluate the constants of an analytical yield function.

The second option is to use crystal plasticity to define the properties of each element. In essence, this means running a material point simulator calculation for each integration point of each element at each iteration of the FEA. While use of analytical functions increase computer processing (CPU) time by about a factor of two or three compared to a von Mises calculation, use of fully-coupled crystal plasticity can increase CPU time by orders of magnitude, and currently is feasible for only the smallest of models and is not practical for simulation of any real forming operation. It would, therefore, be desirable to provide a method of including consideration of anisotropy in an FEA without paying the enormous cost of requiring a full crystal plasticity calculation for every iteration (or even every tenth or hundredth iteration) of an analysis. It would be further advantageous if the method could include a characterization of yield surface and hardening that was defined in a six-dimensional stress space simulated by the FEA.

SUMMARY OF THE INVENTION

It is therefore one object of the present invention to provide an improved method of forming sheet metal into various articles.

It is another object of the present invention to provide such a method which uses mathematical (computational) models to optimize tooling designs and forming operations to give desired properties in the formed articles.

It is yet another object of the present invention to provide such a mathematical model that relies on finite element analysis (FEA) techniques, and takes into account anisotropic properties of the metal sheet without requiring excessive computational time.

It is the principal object of the present invention to provide a method to incorporate anisotropy in to a finite element analysis without the normal penalty in CPU time for doing so by decoupling the anisotropy calculations from the finite element calculations.

The foregoing objects are achieved by the following four steps in an analysis of a forming operation:

1. Uniaxial tension (or compression) curves and crystallographic texture data obtained experimentally from the sheet are used to calibrate the constants in an appropriate crystal plasticity material point simulator. The material point simulator can then be used to generate effective stress—effective strain curves for a variety of possible strain paths. These will form a set with an upper and lower bound.

2. The finite element analysis is preferably done using a local coordinate system that follows the rigid-body motion of the sheet during forming. In this way, the plastic strain (or strain rate) tensor will always be defined in a coordinate system consisting of directions parallel to the rolling direction, perpendicular to the rolling direction and through the thickness of the sheet. Steps one and two define the anisotropy needed for the FEA.

3. The strain path must be determined for each finite element at every converged step (or at predetermined intervals in the analysis). This can be achieved in a variety of ways, with increasing complexity:

by inspection of the geometry of the tooling and forming operation, (e.g., rolling or ironing operations) or by performing an isotropic analysis using a single stress-strain curve (say uniaxial tension) of the forming operation and extracting the required strain path in a post-processing mode for each element, or by calculating at each converged step of analysis a parameter that depends on the particular state of the strain tensor for each element.

4. An appropriate stress strain curve for each element is then selected from the family of curves described in (1) above. In the simplest case, the lower bound is chosen for all elements (independent of their actual paths). This gives a lower bound analysis with the lower limits for stresses in the sheet and tooling loads. The next level of sophistication is to define groups of elements having like strain paths (e.g., a set comprising the dome of a bulge) and assign one of the stress-strain curves from the set described in (1) above to each group. The procedure is seen as analogous to defining temperature-dependent stress strain curves in a finite element model, with the parameter defining the strain path taking the place of temperature.

The result is a finite element model that is in close agreement with experimentally-generated data, and one that requires much less computational (CPU) time compared to prior art methods.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objectives, and advantages thereof, will best be understood by reference to the following detailed description of an illustrative embodiment when read in conjunction with the accompanying drawings, wherein:

DESCRIPTION OF AN ILLUSTRATIVE EMBODIMENT

Figure 1:
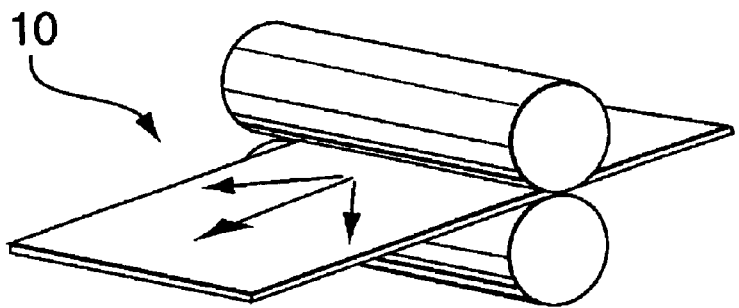
FIG. 1 is a perspective view of a rolling process used to form metal sheet having anisotropic properties, which properties are included in an analysis of tooling, performed in accordance with the present invention.

With reference now to the figures, and in particular with reference to FIG. 1, there is depicted the creation of a metal sheet 10 using a conventional rolling process. As explained further below, various articles may be fabricated from sheet 10. The forming operations and the performance of such products may be optimized in accordance with the present invention. Sheet 10 may be formed from, e.g., rolled aluminum alloy. The mechanical (deformation) properties of sheet 10 are anisotropic, as a result of the orientations of the crystals that make up the sheet. Thus mechanical properties vary for different directions in the sheet, as indicated by the three arrows in FIG. 1.

Figure 2:
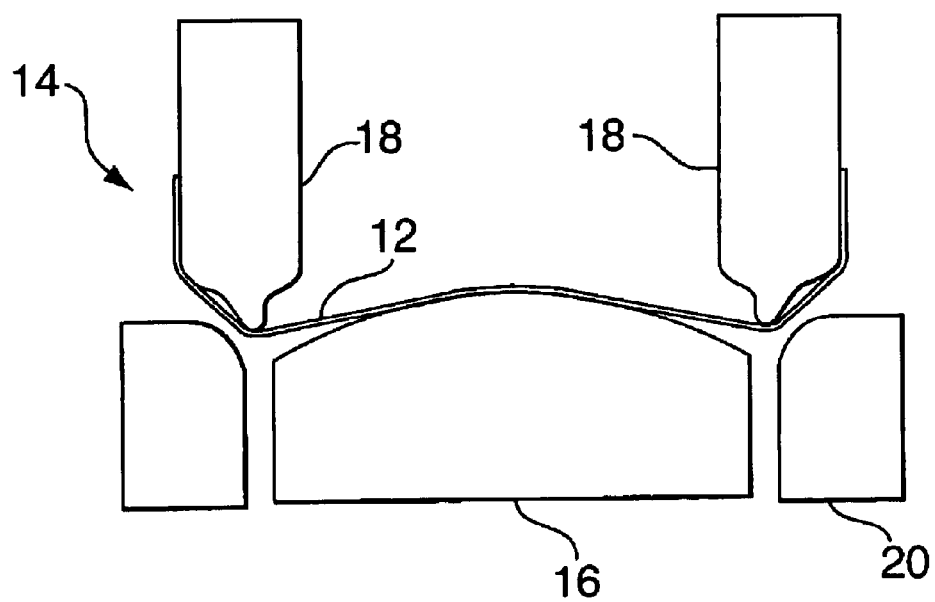
FIG. 2 is a sectional view of tooling adapted for forming a can bottom from aluminum alloy sheet, wherein finite element analysis is performed to optimize the tooling design and the forming operation using the novel approach to describing the anisotropic material properties of the blank in accordance with the present invention.

With further reference to FIG. 2, a blank 12 cut from sheet 10 is shaped into an article using tooling 14. Tooling design and operation and the properties of the product produced can be optimized by FEA, in accordance with the present invention. In the depicted embodiment, a generic representation of the tooling used to produce a can bottom, the tooling 14 is generally comprised of a punch 18, a die (or domer plug) 16 and a retainer ring 20. Tooling 14 may include other conventional components such as a ram or piston (not shown) which is attached to punch 18, whereby punch 18 may be forced into die 16 to form blank 12 into the desired shape. The components of tooling 14 may be constructed using conventional materials, particularly tool steel or tungsten carbide. In this particular implementation, the tooling is designed to form blank 12 into the base of a beverage can. Those skilled in the art will appreciate, however, that the present invention is not limited to this example, as it can be used to design tooling for a wide assortment of finished products and component parts having various sizes and shapes.

The present invention provides a novel computational model for simulating deformation and flow of materials, particularly metal sheet blanks such as blank 12. This model can then be used to optimally design tooling and select material specifications (such as the thickness of the blank). As noted in the Background, conventional analysis techniques use finite element analysis (FEA) to model plasticity and formability. The present invention improves upon these techniques by incorporating anisotropic properties of the blank into a finite element model. The novel computational model achieves this effect by decoupling the anisotropic calculations from the FEA, as explained further below. The result is a model that is not only in close agreement with experimentally-generated data, but that also requires much less computational (CPU) time to run to completion than conventional models that simulate the forming of anisotropic sheet, and hence is much less expensive to carry out.

Figure 3:
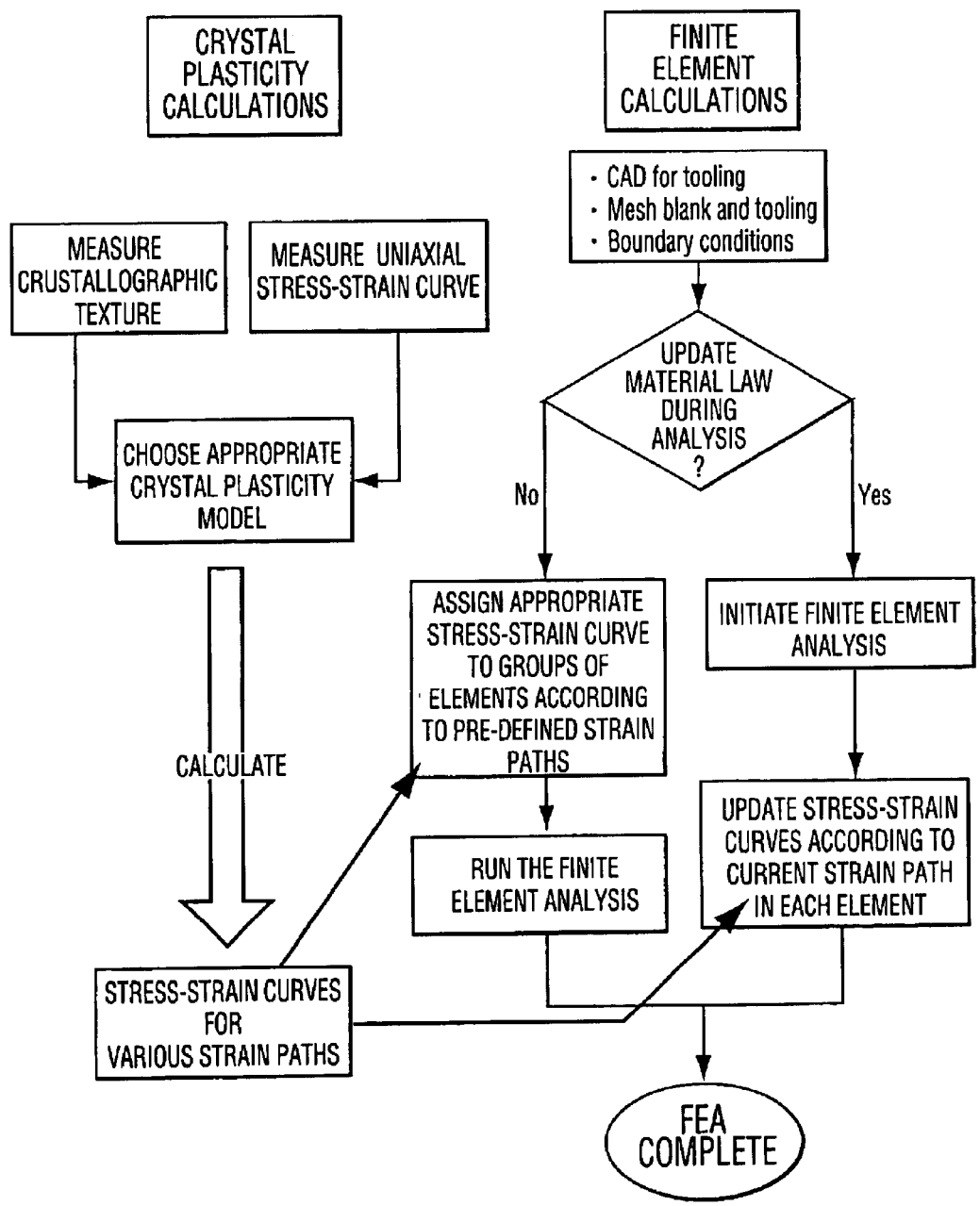
FIG. 3 is a chart depicting the logic flow in carrying out a finite element analysis (FEA) of a forming model according to the present invention, such that anisotropic properties of the metal sheet are decoupled from the analysis.

According to an illustrative implementation of the present invention, a material point simulator (MPS) calculation is decoupled from the FEA, thereby allowing an isotropic FEA plasticity model to capture anisotropy. As noted above, the objective of the FEA is to be able to predict the response of a product to external loading conditions, which often lead to mechanical instability and snap-through or buckling. When a validated performance prediction is required, a forming model must be run prior to the performance model, in order to calculate metal thinning, levels of workhardening and residual stresses prior to the imposition of the performance test loading. For both the forming and performance models, which together constitute the FEA, choice of the appropriate description of the material behavior is critical to the predictive capability of the FEA. According to an illustrative implementation of the present invention, a material point simulator (MPS) calculation is decoupled from the FEA, thereby allowing an isotropic (von Mises) plasticity model to capture material anisotropy. MPS calculations require experimental measurements of the crystallographic texture and at least one stress-strain curve, used to calibrate the hardening law in the MPS. The so-calibrated MPS calculates a set of stress-strain curves for various strain paths commonly found in forming operations. This set of curves will have well-defined upper and lower bounds. Thus the appropriate curve for any specified strain path lies between two well-defined limits. The FEA calculations require definition of the geometry and path of the tooling (generally achieved using an appropriate CAD package), meshing of the tooling and the blank (e.g., the sheet to be formed into a component), definition of the boundary conditions between the tooling and the blank and, most importantly, the assigning of a material stress-strain curve to each element. The latter step can, according to this invention, be done in two ways: prior to running the finite element analysis or during the analysis itself. For the former, the appropriate stress-strain curve for an element or group of elements can be assigned by inspection and understanding of the general nature of the interaction of the tooling with the blank or by performing an isotropic analysis (prior to the desired FEA) to determine the strain path for each element of group of elements and thereby allowing an appropriate stress-strain path to be assigned to each. Alternatively, the assignment of the appropriate stress-strain curve may be updated at each converged step, or at regular intervals of converged steps, in the analysis by relating the current plastic strain tensor for each element to one of the set of stress-strain curves defined previously. The foregoing method of decoupling material anisotropy from the FEA is summarized in FIG. 3.

Figure 4:
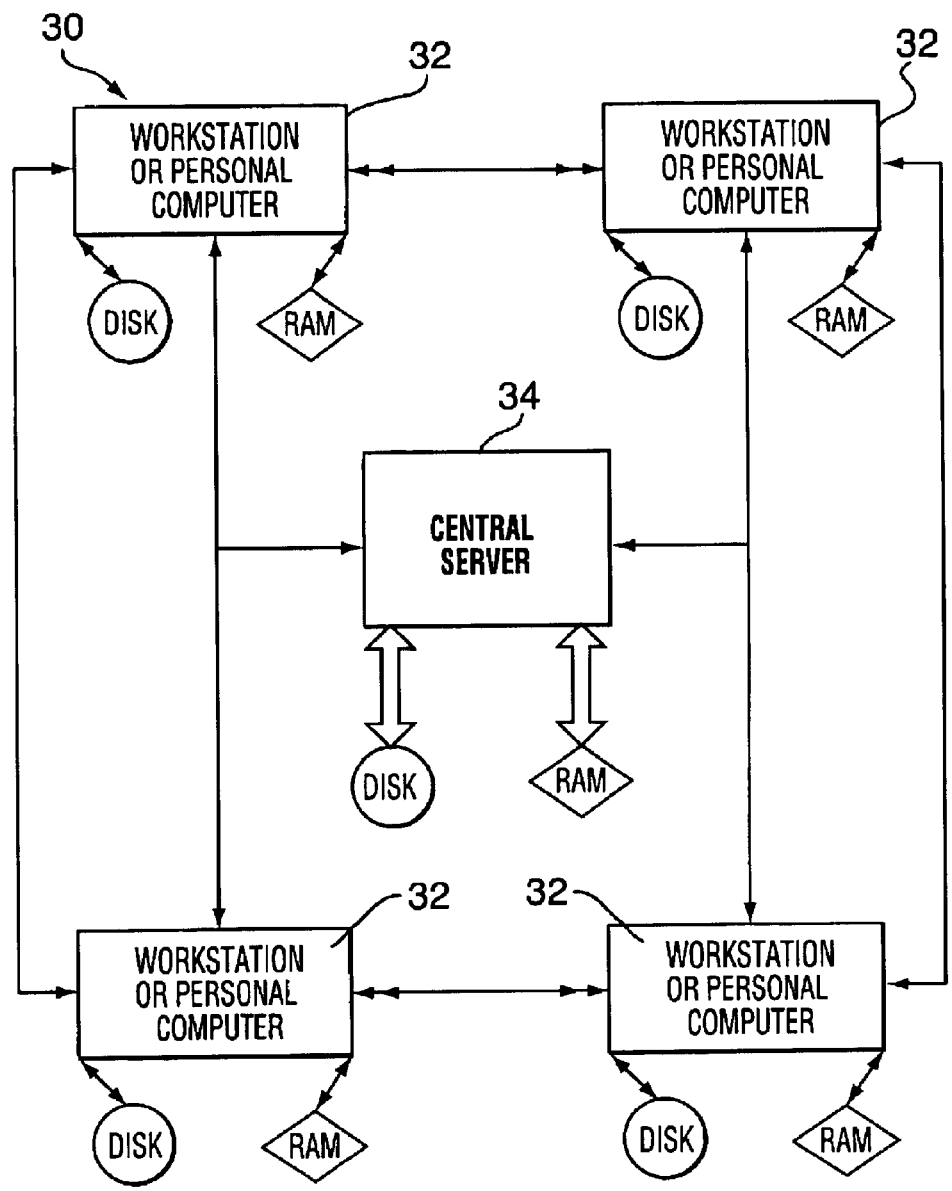
FIG. 4 is a block diagram of a computer system which may be adapted to carry out the FEA according to the present invention.

The novel computational model of the present invention can be carried out on the exemplary computer system 30 of FIG. 4. Such a system will contain one or more central processing units, CPUs, with an appropriate amount of random access memory, RAM, and storage capacity, such as hard disk or tape, 10 devices to link to peripheral units, such as display screens and printers. The system may be stand alone, as for example a single workstation or personal computer, or may consist of a set of networked CPUs 32, including a server 34, (generally with multiple CPUs) and a number of individual workstations or personal computers, linked together by an ethernet or fiber-optic network. The MPS and FEA calculations may be performed on software, installed on the CPUs of the network, using either third-party computer codes (e.g., but not limited to, HKS Inc. Abaqus or LSTC LS-Dyna) or specialty codes written and developed in-house.

Figure 5:
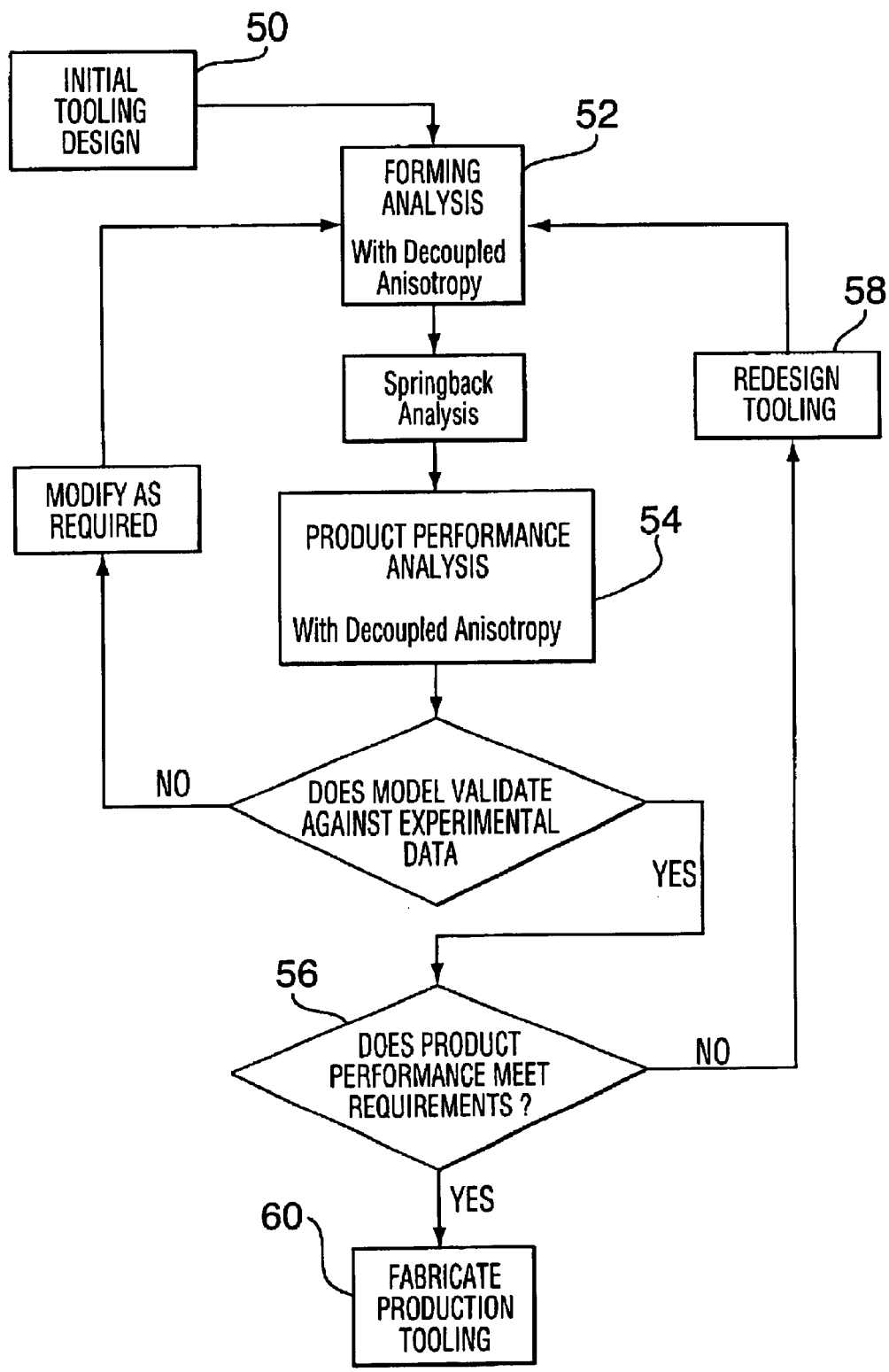
FIG. 5 is a chart depicting the logic flow in designing the tooling and the forming operations required to produce a part with optimum properties using the plasticity model according to the present invention.

As noted above, the novel computational model described herein is used to optimize forming operations, tooling design and product performance. This process is generally shown in FIG. 5. A specific tooling design for a particular article is first proposed (50). The procedure described in FIG. 3, performed on the computer system described in FIG. 4, is then applied to the initial design (52). The "virtual" article whose fabrication is simulated, is then analyzed for product performance (54). If the product does not meet specifications (56), the tooling and its method or operation must be redesigned (58). For example, with reference to tooling 14 of FIG. 2, if the dome reversal pressure of the "virtual" can bottom, produced by the forming simulation and determined by the performance analysis, were too low, geometry of the domer plug and/or motion of the punch could be altered and the complete FEA could be repeated. Steps 50 through 58 are repeated as necessary until a satisfactory design is found. An essential part of the procedure is validation of model predictions against one (usually the initial) design of a prototype component. This validation exercise provides the confidence that the model indeed simulates both the forming and performance operations correctly. Modifications to tooling and forming operations may then proceed with a reasonable degree of confidence. Once the optimization procedure described in FIG. 5 is complete, production tooling may be fabricated (60).

Although the invention has been described with reference to specific embodiments, this description is not meant to be construed in a limiting sense. Various modifications of the disclosed embodiments, as well as alternative embodiments of the invention, will become apparent to persons skilled in the art upon reference to the description of the invention. For example, while the foregoing description pertains to metal sheet, the present invention could also be used to predict deformation and formability of nonmetallic materials. It is therefore contemplated that such modifications can be made without departing from the spirit or scope of the present invention as defined in the appended claims.

What is claimed is:

1. A method of fabricating an article, comprising the steps of:

creating a blank of material having anisotropic mechanical properties;

constructing tooling for an article by predicting flow and deformation of the blank using an analysis which decouples the anisotropic deformation properties of the blank; and forming the article from the blank using the tooling, and wherein the blank is generally flat and is formed from rolled sheet, and wherein the sheet also has anisotropic mechanical properties, and wherein the sheet is a metal sheet, and the analysis of said constructing step includes the further step of calculating the response of a small amount of the blank using crystal plasticity theory, and wherein the analysis of said constructing step includes the further steps of representing the blank and the tooling by meshes having a plurality of elements; defining a set of stress-strain curves depending on the anisotropy of the blank using a crystal plasticity, material point simulator; assigning an appropriate stress-strain curve from such set to each element of the blank, said stress-strain curve lies between an upper bound curve and a lower bound curve; and carrying-out finite element analysis to simulate the forming of the article and its performance after forming.

2. The method of claim 1 wherein said assigning step assigns to a given element a particular curve selected from a set of predefined curves, based on the strain path of each respective element.

3. The method of claim 1 wherein said assigning step assigns to a given element a particular curve obtained by interpolating between two curves from a predefined set of curves, based on a currently recalculated strain path of each respective element.

4. A method of fabricating a product comprising the steps of:

creating a blank of material having anisotropic properties;

optimizing tooling design, forming operations and product performance using a combination of a crystal plasticity, material point simulation and finite element analysis (FEA), that decouples the anisotropy of the material to be formed into a product from the FEA used to simulate the forming operations and the product performance; and constructing tooling based on the FEA and forming the product from the blank using the: tooling according to the forming operations determined from the FEA.

5. A computer system comprising:

a storage device;

a processing unit connected to said storage device; and program means stored on said storage device, and adapted to be executed by said processing unit, for predicting flow and deformation of a blank of material having anisotropic deformation properties, using an analysis which decouples the anisotropic deformation properties of the blank, wherein said program means calculates the response of a small amount of the blank using crystal plasticity theory, and wherein said program means further (i) represents the blank as a mesh having a plurality of elements, (ii) predicts a strain path for each element using finite element analysis (FEA), (iii) defines a stress-strain curve for each element by performing a material point simulator (MPS) calculation for each element using its respective strain path, and (iv) carries out a second FEA on the elements using the respective stress-strain curve for each element, and wherein said program means further defines a stress-strain curve for each element by assigning to each element a curve which lies between an upper bound curve and a lower bound curve.

6. The computer system of claim 5 wherein said program means assigns the lower bound stress-strain curve to all elements.

7. The computer system of claim 5 wherein said program means assigns to a given element a particular curve selected from a set of predefined curves, based on the strain path of each respective element.

8. The computer system of claim 5 wherein said program means assigns to a given element a particular curve obtained by interpolating between two curves from a predefined set of curves, based on a currently recalculated strain path of each respective element.

9. A computer program product comprising:

a storage medium adapted to be read by a computer; and program means stored on said storage medium for predicting flow and deformation of a blank of material having anisotropic deformation properties, using an analysis which decouples the anisotropic deformation properties of the blank, and wherein said program means calculates the response of a small amount of the blank using crystal plasticity theory, and wherein said program means further (i) represents the blank as a mesh having a plurality of elements, (ii) predicts a strain path for each element using finite element analysis (FEA),(iii) defines a stress-strain curve for each element by performing a material point simulator (MPS) calculation for each element using its respective strain path, and (iv) carries out a second FEA on the elements using the respective stress-strain curve for each element, and wherein said program means further defines a stress-strain curve for each element by assigning to each element a curve which lies between an upper bound curve and a lower bound curve.

10. The computer program product of claim 9 wherein said program means assigns the lower bound stress-strain curve to all elements.

11. The computer program product of claim 9 wherein said program means assigns to a given element a particular curve selected from a set of predefined curves, based on the strain path of each respective element.

12. The computer program product of claim 9 wherein said program means assigns to a given element a particular curve obtained by interpolating between two curves from a predefined set of curves, based on a currently recalculated strain path of each respective element.

* * * * *